United States Patent [19]

Brauer

[11] Patent Number: 4,633,422

[45] Date of Patent: Dec. 30, 1986

[54] APPARATUS FOR AND METHOD OF COMPENSATING FOR VARIATIONS DUE TO AGING

[75] Inventor: Frank M. Brauer, Cincinnati, Ohio

[73] Assignee: Cincinnati Electronics Corporation, Cincinnati, Ohio

[21] Appl. No.: 517,428

[22] Filed: Jul. 26, 1983

[51] Int. Cl.[4] .................. G01C 25/00; G01F 25/00
[52] U.S. Cl. ..................... 364/571; 73/1 R; 331/18; 331/176; 364/569; 368/200
[58] Field of Search .......... 364/569, 571; 73/1 R, 73/5, DIG. 4; 331/175, 176, 10, 18; 368/200, 202

[56] References Cited

U.S. PATENT DOCUMENTS

| | | | |
|---|---|---|---|
| 4,097,860 | 6/1978 | Araseki et al. ............ | 364/571 X |
| 4,254,469 | 3/1981 | Whitely ...................... | 364/571 |
| 4,296,364 | 10/1981 | Fukuyama et al. ........ | 364/571 X |
| 4,418,392 | 11/1983 | Hata ........................... | 364/571 |
| 4,443,116 | 4/1984 | Yoshida et al. ............ | 368/202 |
| 4,481,596 | 11/1984 | Townzen .................... | 364/571 |
| 4,502,790 | 3/1985 | Yokoyama ................. | 368/200 |
| 4,525,685 | 6/1985 | Hesselberth et al. ..... | 331/10 |

Primary Examiner—Errol A. Krass
Assistant Examiner—Kevin J. Teska
Attorney, Agent, or Firm—Lowe, Price, Leblanc, Becker & Shur

[57] ABSTRACT

Variations, due to aging, of resonant frequency characteristics of electromechanical resonators are compensated by an oscillator including the resonantor. An indication of the amount of time that the oscillator is operating addresses a table of values indicative of the manner in which the oscillator changes frequency as the resonator ages. From the table of values a signal having a value indicative of a correction factor for the resonator aging is derived. The frequency of the oscillator is controlled in response to the value of the correction factor. The table of values is stored in a re-programmable memory. The values stored in the memory are corrected by comparing the oscillator frequency with a standard frequency.

26 Claims, 3 Drawing Figures

APPARATUS FOR AND METHOD OF COMPENSATING FOR VARIATIONS DUE TO AGING

FIELD OF THE INVENTION

The present invention relates generally to an apparatus for and method of compensating for variations due to aging of equipment and more particularly to such a method and apparatus wherein a computer derives a signal to correct for aging of the equipment.

BACKGROUND ART

It is known that certain types of equipment have output characteristics with a tendency to change as the equipment ages. In particular, electromechanical resonators, e.g., piezoelectric crystals, have resonant frequency characteristics which vary due to temperature and aging of the resonator. The variations have a tendency to cause shifts in an output frequency of an oscillator including a particular resonator. Many systems and methods have been devised for automatically compensating for the variations due to temperature. However, compensation for variations due to aging have generally employed manual techniques or electromechanical devices. The manual techniques and electromechanical devices employed for compensating for aging of an electromechanical resonator have generally involved from time to time comparing the output frequency of an oscillator controlled by the resonator with a standard frequency. In response to a deviation between the oscillator and standard frequencies, the frequency of the oscillator is varied with an electromechanically controlled reactor or by manual adjustment of a reactor. The electromechanical and manual aging adjustments both have serious disadvantages.

Unattended or remote equipment containing electromechanical resonators can not be manually adjusted in many instances. This is particularly true for equipment located on space craft or at other remote monitoring sites. Manual adjustment of equipment that is not remote or which is susceptible to being attended requires circuitry associated with the electromechanical resonator to be open to atmospheric contaminants and corrosion, leading to further instabilities and reduced reliability of the electromechanical resonator, as well as other components associated with the resonator. Human error leading to inaccurate adjustment is another possible problem with manual maintenance of circuitry associated with the electromechanical resonator. Manual adjustment of the resonator to compensate for aging also requires maintenance records to be kept; historically such records have been manually kept, with the possible problems of error and loss.

Electromechanical control of reactors for compensating aging of electromechanical resonators is subject to microphonics which introduces noise and errors in the circuitry associated with the resonators. In addition, electromechanical control of such reactors usually requires significant amounts of power and is likely to require circuitry associated with the resonator to be open to atmospheric contaminants and corrosion.

Another problem with the prior art aging compensating apparatus and methods for variations due to aging in resonant frequency characteristics of electromechanical resonators is that the oscillator associated with the resonator must usually be disconnected from the equipment being driven by the oscillator. Thus, such equipment is not operational during the time while the aging compensation is being performed. Removing the oscillator containing the electromechanical resonator from the equipment being driven by the resonator also may subject that equipment to damage.

It is, accordingly, an object of the present invention to provide a new and improved apparatus for and method of compensating for variations due to aging in output characteristics of equipment.

Another object of the present invention is to provide a new and improved method of and apparatus for compensating for aging variations of electromechanical resonators.

An added object of the present invention is to provide a new and improved method of and apparatus for compensating for aging variations of electromechanical resonators wherein circuitry associated with the resonator is closed to atmospheric contaminants and corrosion.

A futher object of the invention is to provide a new and improved apparatus for and method of automatically compensating for variations due to aging of an electromechanical resonator by using all electronic, low power consuming means.

Still another object of the invention is to provide a new and improved apparatus for and method of compensating for aging of an electromechanical resonator wherein an oscillator driven by the resonator remains in operation while the frequency thereof is compensated.

A further object of the invention is to provide a new and improved apparatus for and method of compensating for aging variations of electromechanical resonators by utilizing extremely low power consuming components which contribute to a highly accurate and stable output of an oscillator including the resonator.

BRIEF DESCRIPTION

In accordance with the present invention, a new and improved apparatus for and method of compensating for variations due to aging in a characteristic of an output signal of a device comprises deriving an indication of the amount of time that the device has been operating. Computer means responds to the operating time indication to derive a signal having a value indicative of a correction factor for the aging effect on the characteristic of the output signal of the device. The output signal of the device is controlled in response to the value of the correction factor so that the characteristic of the output signal of the device has a tendency to be substantially constant as the device ages.

In the preferred embodiment, the computer means includes means for storing a table of values indicative of the manner in which the characteristic of the output signal changes as the device ages. The storing means is responsive to the first signal to derive from the table of values the correction factor indicating signal for the equipment aging.

In accordance with a further aspect of the invention, the means for storing includes a programmable memory. A signal indicative of the manner in which the characteristic of the output signal has actually changed as the device has aged compared to the manner in which the output signal characteristic was initially expected to change with age, from time to time, corrects values in the table. The values of the table are corrected by comparing a signal having a standard value for the device output signal with an actual output signal of the device.

In a particular embodiment of the invention compensation for variations due to aging in resonant frequency characteristics of an electromechanical resonator is provided with an oscillator including the resonator. In response to the number of cycles generated by the oscillator there is derived a first signal indicative of the amount of time that the oscillator has been operating. Computer means responds to the first signal for deriving a second signal having a value indiciative of a correction factor for the resonator aging. The frequency of the oscillator is controlled in response to the value of the second signal. To provide complete compensation for variations of the resonator, the resonator temperature is monitored to control the oscillator frequency.

It is, accordingly, still another object of the present invention to provide a new and improved apparatus for and method of compensating for variations due to aging in output signal characteristics of a device wherein a table of values containing values indicative of the manner in which the output signal changes as the device ages is updated from time to time so that corrections are made to the table if the output signal characteristic changes in a manner different from that initially expected.

The above and still further objects, features and advantages of the present invention will become apparent upon consideration of the following detailed description of one specific embodiment thereof, especially when taken in conjunction with the accompanying drawings.

DETAILED DESCRIPTION

Figure 1:
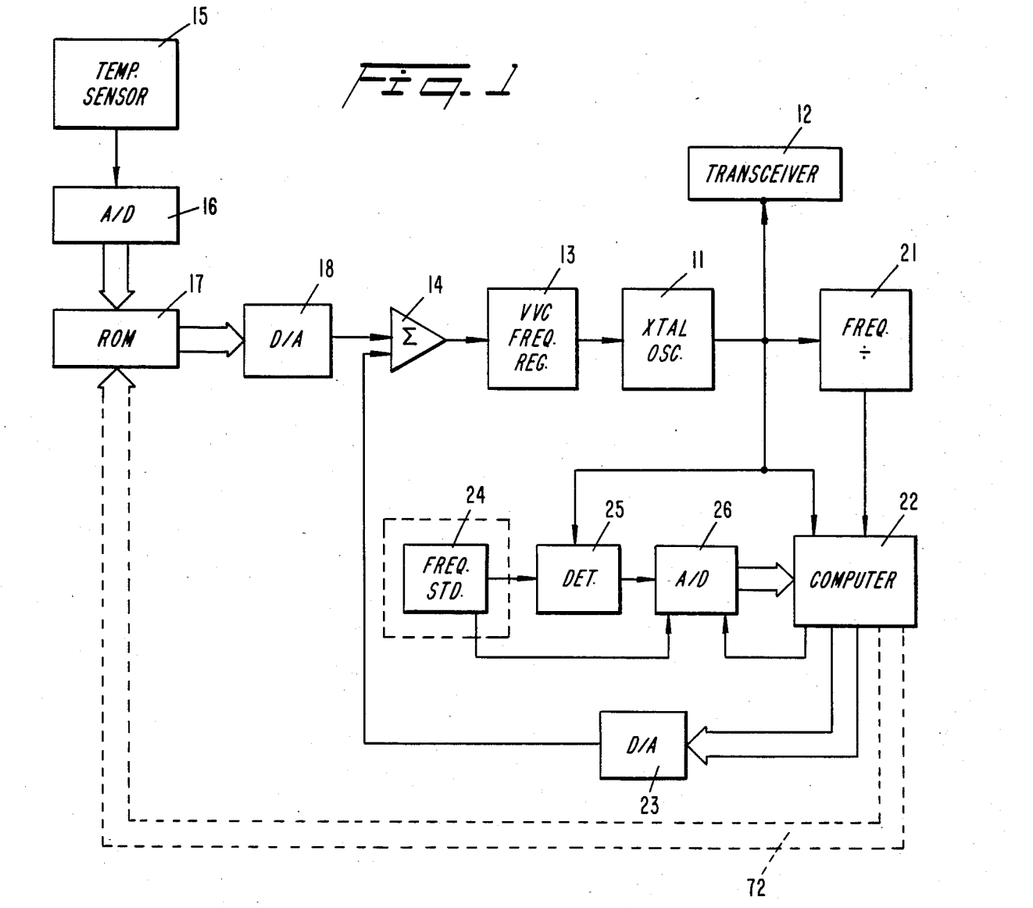
FIG. 1 is a block diagram of a preferred embodiment of the invention.

Reference is now made to FIG. 1 of the drawing wherein there is illustrated circuitry for controlling the output frequency of oscillator 11, including an electromechanical resonator (prefereably a crystal) so that the output frequency of the oscillator is maintained constant, despite the crystal aging and being subject to variations in temperature. The constant output frequency of oscillator 11 is supplied to an appropriate output device, such as transceiver 12, which together with oscillator 11 and the control circuitry therefor, is preferably contained in a hermetically sealed container (not shown) and may be remotely located.

Compensation for changes in the resonant frequency characteristics of the crystal included in oscillator 11 is provided with a variable voltage controlled capacitor frequency regulator 13 which is connected in circuit with the oscillator to affect the output frequency of the oscillator. Variable voltage controlled capacitive frequency regulator 13 is typically a semiconductor device, such as a diode, having a capacitive output reactance that is controlled in response to the amplitude of a DC voltage applied thereto by an output terminal of summing amplifier 14. Summing amplifier 14 includes one input indicative of a correction factor for the frequency of oscillator 11, as a function of the temperature of the crystal included in the oscillator. A second input of amplifier 14 is indicative of a correction factor for the effects of aging of the crystal in oscillator 11 on the oscillator output frequency. Both input signals to summing amplifier 14 are DC voltages, which when summed together by amplifier 14, control the reactance of voltage variable capacitor frequency regulating device 13 to achieve the desired stability in the output frequency of oscillator 11.

Temperature compensation for the crystal of oscillator 11 is achieved with temperature sensor 15, which derives a variable DC output signal having a magnitude indicative of the temperature of the crystal in oscillator 11. The DC output signal of temperature sensor 15 is applied to analog to digital converter 16, which derives a multi-bit output signal having an amplitude indicative of the temperature detected by sensor 15. The output signal of converter 16 is applied as an address input to read only memory 17, programmed to provide a multi-bit binary output signal having a value related to the temperature indicating address input thereof and the characteristics of regulator 13, in combination with the crystal of oscillator 11, to enable the output of the oscillator to remain constant despite temperature variations. The multi-bit output of read only memory 17 is applied to digital to analog converter 18 which derives a DC analog signal that is applied as the first input to summing amplifier 14.

The second, age correcting input of summing amplifier 14 is derived in response to an indication of the amount of time that crystal oscillator 11 has been operating. The indication of the amount of time that oscillator 11 has been operating is determined by supplying the output of the oscillator to frequency divider 21, having a relatively high frequency division factor so that an output pulse is derived from it on a relatively infrequent basis, such as once every hour to every month, depending on resonator aging and the required stability. Because the output frequency of oscillator 11 is maintained substantially constant, each output pulse of frequency divider 21 can be considered as an indication of a unit length of time that oscillator 11 has been operating.

Figure 2:
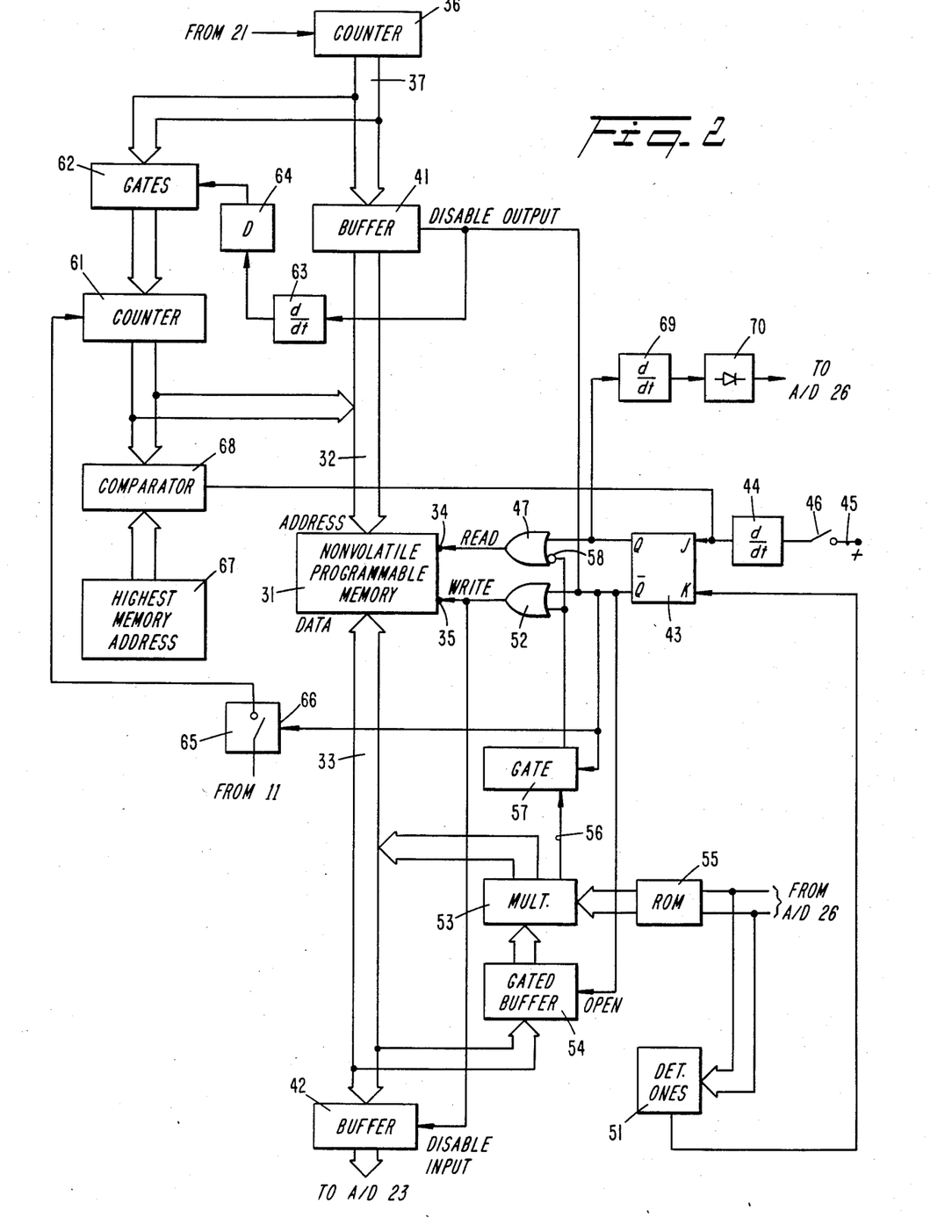
FIG. 2 is a block diagram of one embodiment of the computer of FIG. 1.

The output pulses of frequency divider 21 are applied to one input of computer 22, which can be a dedicated computer as illustrated in FIG. 2, or an appropriately programmed microprocessor with a data memory. Computer 22 includes a counter that is clock ed in response to each output pulse of frequency divider 21 so that the counter stores a continuous indication of the operating time of oscillator 11. In the embodiment described in connection with FIG. 2, the output of the counter addresses a memory in which is stored a table of values indicating the manner in which the output frequency of oscillator 11 is expected to vary as the crystal thereof ages. The table stored in the memory is arranged so that compensation is provided for the expected aging effects of the crystal in oscillator 11 and the characteristics of variable voltage controlled frequency regulator 13 so that the output frequency of the crystal oscillator remains constant, despite aging. Computer 22 supplies a multi-bit output signal indicative of the compensation necessary to overcome the aging effect of the crystal in oscillator 11 to digital to analog converter 23. Converter 23 responds to the signals supplied to it by computer 22 to derive a DC output signal that is supplied as the second input signal to summing amplifier 14. Computer 22 requires a clock pulse source that can be derived from oscillator 11 directly or via a suitable frequency multiplier or divider.

The table of values loaded into the memory of computer 22 can be generated by operating the crystal in oscillator 11 for a certain known interval, such as one month, to determine the expected aging characteristics of the crystal from empirical data derived previously from other crystals of a nature similar to the particular crystal. Alternatively, statistical data on crystals of the type installed in oscillator 11 can be gathered and used to insert data values in the memory within computer 22. Typically, the memory in computer 22 is programmed to provide compensation for the crystal in oscillator 11 over a prolonged time period, such as twenty years. In response to the output of frequency divider 21, the aging effect is updated periodically, such as once every hour to every month, depending on resonator aging and the required stability.

Different crystals employed in different ones of oscillator 11 are subject to different aging characteristics. Thus, the aging characteristics included in the memory in computer 22 may not be accurate for the particular crystal and it may be necessary to change the values in the table of the memory. To this end, the output frequency of oscillator 11 is from time to time checked against a frequency standard derived from an external source. Deviations between the frequency of the frequency standard from the external source and crystal oscillator 11 are supplied to computer 22, to enable the contents of the table of values in the computer to be accordingly updated.

The frequency standard is derived from a device separate from the device including crystal oscillator 11 and transceiver 12. If oscillator 11 and transceiver 12 are included in remote equipment, the frequency standard is derived from a base station and coupled via transceiver 12 to frequency standard source 24. Alternatively, frequency standard 24 can be connected directly into the circuit by appropriate terminals (not shown). The output frequency of standard 24 is compared with the output frequency of oscillator 11 in frequency detector 25. Frequency detector 25 responds to the input signals thereof to derive a DC signal having a magnitude and polarity indicative of the deviation and direction of deviation between the output frequencies of standard 24 and oscillator 11. The DC output signal of detector 25 is coupled to analog to digital converter 26, which supplies a multi-bit binary input signal to computer 22. The multi-bit input signal supplied by converter 26 to computer 22 is processed by the computer to change the values in the table so that they are properly related to the actual aging characteristics of the crystal in oscillator 11. Typically, the contents of the table of values in the memory of computer 22 are infrequently updated, such as once a month, once a year or less often. It is not necessary for the updating to be periodic; e.g. in some instances more frequent adjustment is initially required than after the crystal has been operating for prolonged times. To this end converter 23 includes an output buffer which is normally decoupled from computer 22 and is coupled to the computer in response to signals from the computer and frequency standard only when the computer is correcting the values in the memory.

Reference is now made to FIG. 2 of the drawing, a block diagram of circuitry included in a dedicated computer 22. Computer 22 includes a non-volatile programmable memory 31 in which is stored, at different addresses, values for correction factors to compensate for aging of the crystal in oscillator 11. Typically, memory 31 is an MNOS programmable non-volatile storage device, or some other equivalent device. Memory 31 includes at each address thereof a value to provide for compensation of the aging effects of the crystal. Sufficient numbers of addresses are provided in memory 31 to provide relatively frequent up-dating of the aging characteristics of the crystal in oscillator 11, for a prolonged time period. Typically, memory 31 is addressed once every hour to every month, depending on resonator aging and the required stability and has sufficient addresses to store compensating data for twenty years. Memory 31 includes a multi-bit address bus 32, a multi-bit data bus 33, as well as read and write control input terminals 34 and 35.

During normal operation, i.e., when memory 31 is not being up-dated, address bus 32 of memory is supplied with a signal indicative of the length of time that crystal oscillator 11 has been operating. To these ends, the output of frequency divider 21 is applied to a clock input of counter 36, having a multi-bit output bus 37 on which is continuously derived a multi-bit signal indicative of the length of time oscillator 11 has been operating. The multi-bit time indicating signal on bus 37 is normally applied to address bus 32 of memory 31. Memory 31 normally responds to the signal on address bus 31 to supply a multi-bit compensation indicating signal to data bus 33. The signal on data bus 33 is normally applied to the input of digital to analog converter 23.

When it is necessary to correct the values in the aging compensating table of memory 31 because a finite, i.e., non-zero, output is derived from detector 25 and analog to digital converter 26, the multi-bit output of counter 36 on bus 37 is isolated from address bus 32 and the multi-bit data output on bus 33 is isolated from the input of digital to analog converter 23. To these ends, buffer 41 is connected between busses 37 and 32, while buffer 42 is connected between data bus 33 and the input of digital to analog converter 23. Buffers 41 and 42 respectively include disable output and disable input terminals which are enabled when the correction is to be made. Thereby, counter 36 can be continuously incremented while memory 31 is being corrected without affecting the operation of the memory and a constant aging compensation signal is continuously supplied to converter 23 during the correction interval.

To control memory 31 so that it can operate normally and be corrected, the memory is normally activated so that read input terminal 34 thereof is enabled. During the correction interval, read input terminal 34 and write input terminal 35 are energized in sequence. To control enabling and disabling of read and write input terminals 34 and 35, J-K flip-flop 43 is provided. Flip-flop 43 has a J input terminal that is supplied with a binary one signal when the apparatus is initially put into operation, a result achieved by connecting the J input terminal of the flip-flop to the output of differentiator 44, in turn connected to positive bias terminal 45 by switch 46 which is closed when the apparatus is initially put into operation. Flip-flop 43 is activated into the set state when the apparatus is initially put into operation in response to the leading edge of a binary one pulse derived by differentiator 44 in response to switch 46 being initially closed. The binary one state of flip-flop 43 causes a binary one signal to be supplied by the Q output terminal of the flip-flop to the read input terminal 34 of memory 31 by way of OR gate 47. Simultaneously, the binary zero at the $\bar{Q}$ output terminal of flip-flop 43 supplies binary zero levels to buffers 41 and 42 so that the output of buffer 41 is coupled to address bus 32 and data bus 33 is coupled to the input of buffer 42. Thus, computer 22 is operating in the normal manner.

When the output of frequency detector 25 indicates that there is sufficient deviation between the frequencies of standard 24 and oscillator 11, the apparatus of FIG. 2 is activated so that the contents of the table of memory 31 are corrected. To sense that there is sufficient deviation between the output frequencies of standard 24 and oscillator 11 to warrant correction of the memory table data, the output of converter 26 is applied to network 51. In network 51 are included plural binary one detectors, one for each of the bits derived from converter 26. In response to any one of the output bits of converter 26 having a binary one value, network 51 derives a binary one signal which is applied to the K input terminal of flip-flop 43. The binary one input signal to the K input terminal of flip-flop 43 activates the flip-flop to the reset state, whereby a binary one level is derived from the $\bar{Q}$ output terminal thereof. The binary one at the $\bar{Q}$ output terminal of flip-flop 43 transforms computer 22 into the correction mode.

To correct the contents of memory 31, the compensating data values at each address of the memory are sequentially read out of the memory, corrected and written back into the same address of the memory. The current address in counter 36 is the first address read out and corrected, with additional addresses being sequentially read out and corrected and written back into the memory until the highest address in the memory has been corrected. When the highest memory address has been corrected, the computer is returned to the normal condition.

To correct the stored values in memory 31 at each address, the data at each address are sequentially applied as a multi-bit input to digital multiplier network 53 by way of gated buffer network 54. Gated buffer network 54 includes a buffer register stage for each bit of data bus 33 and a gate for the output of each stage of the buffer. The gate for each stage of the buffer in network 54 is normally closed to preclude coupling of signals in the buffer stages to the input of multiplier 53. In response to flip-flop 43 being activated into the reset state, the binary one level at the $\bar{Q}$ output of the flip-flop opens the gates of network 54, to couple the data signals stored in the buffer stages of network 54 to a first input bus of multiplier 53.

Multiplier 53 increments the values supplied thereto on the first bus by a factor indicative of the deviation between the frequencies of standard 24 and oscillator 11. To these ends, the output of converter 26 is supplied as an address input to read only memory 55, having a multi-bit output bus that is coupled to a second input bus of multiplier 53. Read only memory 55 is programmed so that in response to a zero error between the frequencies of standard 24 and oscillator 11, a multiplication factor of one is applied by it to multiplier 53. In response to positive and negative deviations between the frequencies of standard 24 and oscillator 11, the magnitude of the output signal of read only memory 55 deviates above and below a value of one, or vice versa, depending upon the characteristics of the crystal in oscillator 11 and the nature of regulator 13, summing network 14 and digital to analog converter 23. The resulting, corrected output value for the data at the address read out of memory 31 is supplied to an output buffer of multiplier 53. When the output buffer of multiplier 53 has been loaded, the multiplier derives a binary one signal that is coupled to lead 56. Shortly after the leading edge of the binary one signal supplied by multiplier 53 to lead 56 and only while the binary one is supplied to lead 56 the product indicating signal in the output buffer of multiplier 53 is supplied as a multi-bit signal to data bus 33. The signal supplied by multiplier 53 to bus 33 is written into the same address in memory 31 as the address from which the data just previously supplied to multiplier 53 were read.

To this end, write input terminal 35 of memory 31 is enabled to the exclusion of read input terminal 34 of the network when multiplier 53 is supplying data bus 33 with the correction signal. To activate memory 31 from a read to a write status, multiplier 53 supplies the short duration binary one pulse to lead 56 when the multiplier output buffer is loaded. The pulse on lead 56 is coupled through gate 57 only when computer 22 is in the correction mode, a result achieved by coupling a binary one signal to an enable input terminal of the gate from the $\bar{Q}$ output terminal of flip-flop 43. The binary one pulse coupled from lead 56 through gate 57 is coupled through OR gate 52 to the write input of memory 31, so that the output signal of multiplier 53 is supplied to the address in memory 31 indicated by address bus 32 only when the multiplier is deriving a finite product indicating signal. At all other times the output of multiplier 53 is decoupled from data bus 33 and a binary zero level is supplied by multiplier 53 to lead 56. The binary zero level on lead 56 is coupled through gate 57 to inverting input terminal 58 of OR gate 47. Thereby, a binary one signal is supplied by OR gate 47 to read input terminal 34 of memory 31 at all times, except when multiplier 53 is deriving a signal indicative of a product indicating output being derived thereby.

To enable memory 31 to be addressed sequentially at high frequency while computer 22 is in the correction mode for data in memory 31, counter 61 is provided. Counter 61 has the same number of stages as counter 36 and includes a load input bus that is supplied with the count in counter 36 when computer 22 is initially activated into the mode for correcting the values in memory 31. To this end, output bus 37 of counter 36 is applied to gates 62; the number of gates 62 is equal to the number of bits in the output of counter 36. Gates 62 are open when flip-flop 43 is switched from the set to the reset state, a result achieved by coupling the signal at the $\bar{Q}$ output terminal of flip-flop 43 to differentiator 63, which drives rectifier 64 so that gates 62 are open only in response to flip-flop 43 switching from the set to the reset state. Thereby, the contents of counter 36 are loaded into counter 61 only when computer 22 is switched into the correction mode.

With counter 61 loaded with the contents of counter 36 at the time of computer 22 being activated into the correction mode, counter 61 is advanced through all of the addresses of memory 31 between the address indicated by counter 36 and the highest address in the memory where data are stored for correction of the crystal in oscillator 11. To this end, counter 61 includes a clock input terminal responsive to pulses derived from oscillator 11, as coupled through switch 65. Switch 65 is normally open, but is closed throughout the interval while computer 22 is in the correction mode, a result achieved by coupling the signal at the $\bar{Q}$ output terminal of flip-flop 43 to enable input terminal 66 of switch 65. It may be necessary, because of the relative frequency of oscillator 11 and the operating speed of multiplier 53 and memory 31, to connect a frequency divider or multiplier (not shown) between oscillator 11 and the clock input of counter 61. In response to pulses coupled to the clock input of counter 61 by way of gate 65, the counter is incremented, to increment address bus 32 and thereby provide for sequential reading and writing of successive addresses of memory 31, with appropriate corrections being applied to the data being written back into the addresses.

When the count in counter 61 is commensurate with the highest address in memory 31, a binary one signal is applied to the J input terminal of flip-flop 43. To these ends, static register 67 is provided with a multi-bit signal commensurate with the highest address in memory 31. The multi-bit signal of address 67 is compared with the multi-bit output of counter 61 in comparator 68. In response to the contents of counter 61 and register 67 being equal, comparator 68 derives a binary one signal which is coupled to the J input terminal of flip-flop 43. Flip-flop 43 responds to the output of comparator 68 so that the flip-flop is reset in response to the leading edge transition of the comparator output.

Resetting of flip-flop 43 causes return of comparator 22 to normal operation because read and write input terminals 34 and 35 of memory 31 are respectively enabled and disabled by the flip-flop output. The time indicating count in counter 36, which may have been incremented during the correcting operation, is reapplied to the address input of memory 31. To provide return to normal operation, the positive going transition in the signal at the Q output terminal of flip-flop 43 is detected by differentiator 69 and rectifier 70 which supplies a signal to analog to digital converter 26, to decouple the signal in the output buffer of the converter to the input of computer 22. The signal in the output buffer of converter 26 remains decoupled from computer 22 until frequency standard 24 supplies an enable input signal to the output buffer of converter 26 to command the frequency error indicating signal in the buffer to be coupled to computer 22.

The invention is also applicable to crystals in which temperature and aging are interrelated functions. In such a case, read only memory 17 is a two input read only memory or function generator. The age indicating contents of counter 36 are applied to address bus 72 (indicated by dotted lines) of the two input memory 17. The other input of the two input read only memory 17 is an indication of the temperature of the crystal in oscillator 11, as derived from converter 16. The two input read only memory 17 responds to the input signals thereof to derive a crystal temperature compensating signal that is also compensated for the crystal age. The output of the two input read only memory is applied to digital to analog converter 18, thence to summing amplifier 14. A similar result can be achieved with a two input read only memory in computer 22. In such an instance the age compensating output signal of memory 31 and the temperature indicating output signal of converter 16 are respectively applied to first and second input busses of the two input read only memory. The two input read only memory derives a multi-bit output signal that indicates a correction factor for temperature and age. The multi-bit output signal of the two input read only memory is applied to digital to analog converter 23 which drives regulator 13 directly. Such a configuration eliminates read only memory 17, digital to analog converter 18, and summing amplifier 14.

Figure 3:
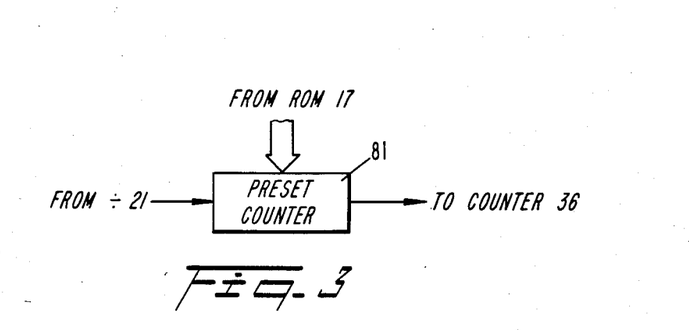
FIG. 3 is a modification of a portion of a second embodiment of the computer.

Certain crystals exhibit differential aging as a function of temperature. For example, such crystals age faster at high temperature than at low temperature. In accordance with another aspect of the present invention, such aging is compensated by determining the integral of a product of the temperature and aging and using the integral to address memory 31. To these ends computer 22 is modified as indicated in FIG. 3 so the parallel output of read only memory 17 is applied as a load input to variable frequency divider 81, also responsive to the output of frequency divider 21. Divider 81 functions as a variable predetermined counter that generates an output pulse for every Nth cycle derived from divider 21, where N is an integer determined by the temperature detected by sensor 15, as derived from read only memory 17. The pulses derived from divider 81 thus represent the product of temperature and operating time of the crystal in oscillator 11. The output pulses of divider 81 are applied to the clock input of counter 36 which effectively functions as an integrator to derive the integral representing signal that is applied as an address input to memory 31, as described supra for FIG. 2. The remainder of the computer for the time-temperature integrated compensation is constructed and performs as indicated for FIG. 2.

While there has been described and illustrated one specific embodiment of the invention, it will be clear that variations in the details of the embodiment specifically illustrated and described may be made without departing from the true spirit and scope of the invention as defined in the appended claims. For example, a single digital to analog converter could be employed and multiplexed and/or separate variable voltage controlled capacitors could be used in separate branch circuits of oscillator 11. Also, all aspects of the invention are not limited to compensating aging effects of crystals on the output frequency oscillators; some aspects of the invention can be used for age compensation of other characteristics of output signals of other devices. With some crystals, there is a mathematical formula relating aging and/or temperature to compensation of the effect of the crystal on the output frequency of oscillator 11. In such an instance memories 31 and/or 17 can be replaced by mathematical function generator(s) driven by the output(s) of counter 36 and/or converter 16.

What is claimed:

1. Apparatus for compensating for variations due to aging in resonant frequency characteristics of an electromechanical resonator, said compensating apparatus comprising an oscillator including the resonator, means responsive to the number of cycles generated by the oscillator for deriving a first signal indicative of the amount of time that the oscillator has been operating, computer means responsive to the first signal for deriving a second signal having a value indicative of a correction factor for the resonator aging, and means for controlling the frequency of the oscillator in response to the value of the second signal.

2. The apparatus of claim 1 further including means for monitoring the temperature of the resonator, and means connected to be responsive to an indication of the monitored temperature for coupling a signal to the oscillator for controlling the frequency of the oscillator.

3. The apparatus of claim 1 wherein the computer means includes: means for storing a table of values indicative of the manner in which the oscillator changes frequency as the resonator ages, means for addressing the table of values in response to the first signal, and means for deriving the second signal in response to a value read from the table of values in response to the means for addressing.

4. The apparatus of claim 3 wherein the means for storing the table of values indicative of the manner in which the oscillator changes frequency as the resonator ages includes a programmable memory, and means responsive to a third signal indicative of the manner in which the resonator has actually aged compared to the manner in which the resonator was initially expected to age for correcting the values indicative of the manner in which the oscillator changes frequency as the resonator ages in the table of the programmable memory.

5. The apparatus of claim 4 wherein the means for correcting the values of the table indicative of the manner in which the oscillator changes frequency as the resonator ages includes: frequency standard means for deriving a signal having a standard frequency for the oscillator frequency, means for comparing the standard frequency with the frequency of the oscillator for deriving an error signal having a magnitude indicative of the deviation between the oscillator frequency and the standard frequency, and means responsive to the magnitude of the error signal for changing the values indicative of the manner in which the oscillator changes frequency as the resonator ages by a factor commensurate with said magnitude.

6. The apparatus of claim 5 wherein the resonator is susceptible to differential aging as a function of temperature, and further including means for monitoring temperature of the resonator, means responsive to the monitored temperature and the corrected values of the table indicative of the manner in which the oscillator changes frequency as the oscillator ages for controlling the frequency of the oscillator as a function of the temperature and age of the resonator.

7. The apparatus of claim 6 wherein the resonator aging occurs faster at high temperature than at low temperature and the function is proportional to the integral of the product of resonator age and temperature to compensate for the resonator aging which occurs faster at high temperatures than at low temperatures.

8. A method of compensating for variations due to aging in characteristics of an oscillator, said compensating method comprising responding to the number of operating cycles of the oscillator to indicate the amount of time that the oscillator has been operating, storing in a computer memory a table of values indicative of the manner in which the number of operating cycles of the oscillator changes as the oscillator ages, said computer memory being responsive to the indicated time to derive from the table of values an indication of a correction factor for the oscillator aging, and controlling the frequency of an output signal of the oscillator in response to the correction indication so that the frequency of the output signal of the oscillator has a tendency to remain independent of the oscillator aging.

9. The method of claim 8 wherein the memory is programmable, and further including indicating the manner in which the oscillator has actually aged compared to the manner in which the oscillator was initially expected to age, and in response to the comparison of the aging manners correcting the values in the table of the programmable memory indicative of the manner in which the number of operating cycles changes as the oscillator ages so they conform with the manner in which the oscillator has actually aged.

10. The method of claim 9 wherein the values of the table are corrected by from time to time deriving a signal from a frequency standard having a standard frequency for the oscillator output frequency, and wherein the comparison is of the standard frequency with the output frequency of the oscillator, the comparison resulting in an error signal having a magnitude indicative of the deviation between the oscillator output frequency and the standard frequency, and changing the values in the table indicative of the manner in the number of operating cycles changes as a function of the magnitude of the error signal.

11. The method of claim 8 wherein the operating time of the oscillator is indicated by counting a sub-multiple of the output frequency of the oscillator.

12. The method of claim 8 wherein the oscillator frequency has a tendency to change as a function of operating time and temperature, and controlling the frequency of the oscillator as a function of the temperature and age of the oscillator.

13. The method of claim 8 wherein the oscillator frequency has a tendency to change as a function of operating time and temperature such that aging occurs faster at high temperatures than at low temperatures, and controlling the frequency of the oscillator by an amount proportional to the integral of the product of the temperature and age of the oscillator to compensate for the aging which occurs faster at high temperature than at low temperature.

14. A method of compensating for aging of an electromechanical resonator in an oscillator comprising the steps of responding to the output frequency of the oscillator to indicate the number of operating cycles of the oscillator, responding to the indicated number of the oscillator operating cycles to address a programmable table of values, said table of values being initially programmed to relate aging of the resonator to the oscillator output frequency so that compensating signals are stored at the different addresses of the table for the frequency of the oscillator as a function of aging, supplying the compensating signals to the resonator to maintain the oscillator frequency constant despite the aging, from time to time comparing the oscillator frequency with a standard frequency for the oscillator frequency to derive an error magnitude indicative of the deviation between the oscillator frequency and the standard frequency, changing the values in the table in response to the value of the error magnitude so that the stored compensating signals are revised in value, and supplying the revised stored compensating signals to the resonator to maintain the oscillator frequency constant despite the aging after the oscillator frequency and standard frequency have been compared.

15. A method of compensating for aging and temperature of an electromechanical resonator in an oscillator, the resonator having a tendency to age faster at high temperature than at low temperature, comprising the steps of monitoring the resonator temperature, responding to the output frequency of the oscillator to indicate the number of operating cycles of the oscillator, responding to the indicated number of the oscillator operating cycles to address a programmable table of values, said table of values being initially programmed to relate aging of the resonator to the oscillator output frequency so that compensating signals are stored at the different addresses of the table for the frequency of the oscillator as a function of aging, responding to the compensating signals and an indication of the monitored temperature to derive a correction factor for the oscillator frequency as a function of temperature and age, said correction factor being a function of the integral of the product of the number of operating cycles and the monitored temperature, to compensate for the aging which occurs faster at high temperature, and controlling the oscillator frequency in response to the correction factor to maintain the oscillator frequency constant despite the aging and temperature effects.

16. The method of claim 15 further including changing the values in the table in response to the value of the error magnitude so that the stored compensating signals and the correction factor are revised in value, the oscillator frequency being controlled in response to the revised correction factor after the oscillator frequency and standard frequency have been compared.

17. A method of compensating for variations due to aging in operation of a cyclically operating device comprising the steps of determining the length of operating time of the device, responding to the determined length of operating time of the device to address a programmable table of values, said table of values being initially programmable to relate aging of the device to the device operating frequency so that compensating signals are stored at the different addresses of the table for the frequency of the device as a function of aging, supplying the compensating signals to the device to maintain the device operating frequency constant despite the aging, from time to time comparing the device operating frequency with a standard value for the device operating frequency to derive an error magnitude indicative of the deviation between the device operating frequency and the standard frequency, changing the values in the table in response to the value of the error magnitude so that the stored compensating signals are revised in value, and supplying the revised stored compensating signals to the device to maintain the device operating frequency constant despite the aging after the device operating frequency and standard frequency have been compared.

18. A method of compensating for aging and temperature of a cyclically operating device having a tendency to age faster at high temperature than at low temperature, comprising the steps of monitoring the device temperature, determining the length of operating time of the device, responding to the determined length of operating time of the device to address a programmable table of values, said table of values being initially programmable to relate aging of the device to the device operating frequency so that compensating signals are stored at the different addresses of the table for the frequency of the device as a function of aging, responding to the compensating signals and an indication of the monitored temperature to derive a correction factor for the device operating frequency as a function of temperature and age, said correction factor being a function of the integral of the product of the number of operating cycles and the monitored temperature to compensate for the aging which occurs faster at high temperature, and controlling the device operating frequency in response to the correction factor to maintain the device operating frequency constant despite the aging and temperature effects.

19. The method of claim 18 further including changing the values in the table in response to the value of the error magnitude so that the stored compensating signals and the correction factor are revised in value, the device operating frequency being controlled in response to the revised correction factor after the device operating frequency and standard frequency have been compared.

20. The method of claim 19 wherein the device operating frequency has a tendency to change as a function of operating time and temperature such that aging occurs faster at higher temperatures than at low temperatures, and controlling the operating frequency of the device by an amount proportional to the integral of the product of the temperature and age of the device to compensate for the aging which occurs faster at high temperature than at low temperature.

21. A method of compensating for variations due to aging in characteristics of a device, said compensating method comprising indicating the amount of time that the device has been operating, storing in a computer memory a table of values indicative of the manner in which the number of operating cycles of the device changes as the device ages, said computer memory being responsive to the time indication to derive from the table of values an indication of a correction for the operating frequency of the device in response to the correction indication so that the operating frequency of the device has a tendency to remain independent of the device aging, the memory being programmable, indicating the manner in which the device operating frequency has changed with age compared to the manner in which the device was initially expected to age, and in response to the comparison of the aging manners correcting the values in the table of the programmable memory indicative of the manner in which the number of operating cycles changes as the device ages so they conform with the manner in which the device has actually aged.

22. The method of claim 21 wherein the values of the table are corrected by from time to time deriving a signal having a standard value for the device operating frequency, and wherein the comparison is of the standard value for the device operating frequency with the actual operating frequency of the device, the comparison resulting in an error signal having a magnitude indicative of the deviation between the device actual operating frequency and the standard value for the device operating frequency, and changing the values in the table indicative of the manner in which the number of operating cycles changes as a function of the magnitude of the error signal.

23. Apparatus for compensating for variations due to aging in operation of a device, comprising means for deriving a first signal indicative of the amount of time that the device has been operating, computer means responsive to the first signal for deriving a second signal having a value indicative of a correction factor for the device aging, means for controlling the operation of the device in response to the value of the second signal, said computer means including: means including a programmable memory, for storing a table of values indicative of the manner in which the device changes operation as the device ages, means for addressing the table of values in response to the first signal, means for deriving the second signal in response to a value read from the table of values in response to the means for addressing, and means responsive to a third signal indicative of the manner in which the device has actually changed operation with age compared to the manner in which the device was initially expected to change operation with age for correcting the values indicative of the manner in which the device changes operation as the device ages in the table of the programmable memory.

24. The apparatus of claim 23 wherein the means for correcting the values of the table indicative of the manner in which the device changes operation as the device ages includes: standard means for deriving a signal having a standard value for an output of the device, means for comparing the standard value with an actual output of the device for deriving an error signal having a magnitude indicative of the deviation between the actual output and the standard value for the device output, and means responsive to the magnitude of the error signal for changing the values indicative of the manner in which the device changes output as the device ages by a factor commensurate with said magnitude.

25. The apparatus of claim 24 wherein the device is susceptible to differential aging as a function of temperature, and further including means for monitoring temperature of the device, means responsive to the monitored temperature and the corrected values of the table indicative of the manner in which the device changes output as the device ages for controlling the output of the device as a function of the temperature and age of the device.

26. The apparatus of claim 25 wherein the device aging occurs faster at high temperature than at low temperature and the function is proportional to the integral of the product of device age and temperature to compensate for the device aging which occurs faster at high temperature than at low temperature.

* * * * *